(12) United States Patent
Zang (10) Patent No.: US 7,218,851 B1
(45) Date of Patent: May 15, 2007

(54) COMMUNICATION NETWORK DESIGN WITH WAVELENGTH CONVERTERS

(75) Inventor: Hui Zang, Burlingame, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 700 days.

(21) Appl. No.: 10/246,587

(22) Filed: Sep. 18, 2002

(51) Int. Cl.
*H04B 10/08* (2006.01)
*H04B 10/20* (2006.01)

(52) U.S. Cl. .............................. 398/33; 398/25; 398/58

(58) Field of Classification Search .................. 398/1, 398/6, 17, 18, 19, 33, 58, 61, 62, 63, 64, 398/69, 173, 175, 176, 25; 370/216, 242, 370/254, 255, 230.1, 232, 235, 238
See application file for complete search history.

(56) References Cited

U.S. PATENT DOCUMENTS 6,574,669 B1 * 6/2003 Weaver ....................... 709/239
6,643,464 B1 * 11/2003 Roorda et al. ................ 398/59
6,772,102 B1 * 8/2004 Wan et al. ...................... 703/2
2003/0020977 A1 * 1/2003 Smith .......................... 359/110
2003/0099014 A1 * 5/2003 Egner et al. ................ 359/124
2004/0220886 A1 * 11/2004 Kumaran et al. ........... 705/400

OTHER PUBLICATIONS

Poppe, Papadimitriou, F., "Inference of Shared Risk Link Groups," IETF Internet Draft, Nov. 2001.
Arora, A. S. and Subramaniam, S., "Converter Placement in Wavelength Routing Mesh Topologies," ICC 2000. p. 1282-88, New Orleans, LA, Jun. 2000.
Zang, H., Mukherjee, B., "Connection Management for Survivable Wavelength-Routed WDM Mesh Networks," Optical Networks Magazine, vol. 2, No. 4, Jul./Aug. 2001.
Su, C.F.; Su, X., "Protection Path Routing on WDM Networks," IEEE/OSA OFC 2001, Tu02, Anaheim, CA. Mar. 2001.

* cited by examiner

*Primary Examiner*—Dalzid Singh (57) ABSTRACT

A design system receives a configuration of the communication network wherein the configuration includes a plurality of nodes and a plurality of links interconnecting the nodes. The design system also receives a protection scheme for the communication network. The design system then processes the configuration and the protection scheme to determine placements of wavelength converters in at least one of the nodes.

30 Claims, 9 Drawing Sheets

COMMUNICATION NETWORK DESIGN WITH WAVELENGTH CONVERTERS

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of telecommunications, and in particular, to methods and systems for designing communication networks with wavelength converters.

2. Description of the Prior Art

Communication networks include network elements that are connected to each other through communication links. Some examples of network elements are transceivers, switches, routers, and cross-connect devices. Some of these network elements use optical technology to exchange communications over optical fiber links. One such technology is wavelength division multiplexing (WDM), where each wavelength of an optical signal carries a different channel of communications. Thus, an optical fiber link carries a number of channels of communications using WDM.

These optical transmission channels between two network elements are called lightpaths. A lightpath may travel through multiple fiber links. Some lightpaths operate at the rate of a few gigabits per second (Gbps). In some communication networks without wavelength converters, a lightpath occupies the same wavelength on all the fiber links that it traverses, which is referred to as wavelength continuity. When using lightpaths, the routing of the lightpaths and the wavelength assignment of lightpaths are determined, which is referred to as the "routing and wavelength assignment problem".

In one example of the communication networks, the network elements within the communication network are connected in a ring configuration. Each network element is connected to two other network elements to form a ring. Some rings are connected to other rings, where shared network elements are stacked to interconnect rings. These ring configurations have poor scalability and use excessive resource redundancy. Thus, network configurations are migrating from ring networks to mesh networks, where network elements are connected to two or more network elements.

Network element or optical fiber link failure in a communication network results in loss of data or delays in data, which both result in revenue loss. There are two types of fault management to handle the failure of the network element or optical fiber link: protection and restoration. Restoration is a reactive procedure in which spare capacity is available after the fault's occurrence is utilized for rerouting the disrupted connections. Protection is a proactive procedure in which spare capacity is reserved during connection setup.

Protection fault management schemes are classified by type of rerouting and type of resource sharing. In a link-based rerouting, the connections are rerouted around the end network elements of the failed link. In a path-based rerouting, a backup path is selected between the end nodes of the primary path. In a dedicated resource protection, the network resources such as wavelengths are not shared between backup paths. In a shared resource protection, the backup paths do share resources such as wavelengths, which utilizes network resources more efficiently. Dedicated-path protection, shared-path protection, and shared-link protection are the major options for survivability in optical meshed WDM networks. Dedicated-path protection is also referred to as 1+1. In shared-path protection, the backup paths can share resources as long as the corresponding primary paths are not in the same shared risk group (SRG). Two primary paths are in the same SRG if they traverse the same fiber, or the fibers they traverse are in the same cable or in the same duct. In shared-link protection, the backup path for a link can share resources with the backup path for another link.

Mesh-based shared protection schemes take advantage of the mesh connectivity and achieve better resource utilization compared to 1+1. In a communication networks with wavelength converters, a lightpath does not have to occupy the same wavelength on all the links. Wavelength conversion facilitates the sharing among protection resources and improves the resource utilization in a network with shared protection.

Having wavelength-conversion at every node is not usually cost-effective. Next generation transport networks are expected to be hybrid, consisting of optical cross-connects (OXCs) of different architectures and technologies (OOO and OEO). OEO OXCs are capable of wavelength conversion, while OOO OXCs are not. Deploying all-optical wavelength-converters for every wavelength at every network node could be very costly. Choosing wavelength conversion sites is important to lower the overall network cost, which is called the Wavelength-Converter Placement (WCP) problem. Previous work has been focused on a network with dynamic traffic in which proper WCP can lower the call blocking probability. Prior work on WCP has not considered the protection schemes used in a network, which is an important element to network design.

The WCP problem is as follows. Given a network topology of N nodes and a set of traffic demands with a set of shared protection constraints, choose K wavelength-conversion sites (K<N) such that all the traffic demands are satisfied with a minimum network transport cost. Here the cost is measured in wavelength-links accumulated over all the working and protection paths. The converter placement not only affects the wavelength sharing among protection paths, but also affects the routing of working and protection paths. The WCP problem can be proved to be NP-hard, which means that, an optimal solution is not likely to be found if the problem size is big.

SUMMARY OF THE INVENTION

The inventions solve the above problems by designing a communication network that uses wavelength division multiplexing. A design system receives a configuration of the communication network wherein the configuration includes a plurality of nodes and a plurality of links interconnecting the nodes. The design system also receives a protection scheme for the communication network. The design system then processes the configuration and the protection scheme to determine placements of wavelength converters in at least one of the nodes.

In some embodiments, the configuration comprises a number of wavelengths available on each of the plurality of links, an amount of traffic between the plurality of nodes, a number of wavelength converters in the communication network, and/or a total number of wavelength-links. In some embodiments, the design system determines potential functions for each of the plurality of nodes wherein the potential functions indicate a suitability of placing one of the wavelength converters at one of the nodes and determine placements of the wavelength converters at the nodes using the potential functions. In one embodiment, the potential functions indicate a number of nodes that one of the nodes is connected to. In one embodiment, the potential functions indicate a number of wavelengths used for working traffic or protection traffic on all of the links that one of the nodes is connected to. In another embodiment, the potential functions indicate a number of wavelengths used for protection traffic on all of the links that one of the nodes is connected to.

The design system advantageously considers protection requirements and attempts to minimize the network resource usage by maximizing the protection resource sharing through proper wavelength converter placement. The communication network then achieves good performance where a limited number of wavelength-converters are placed.

BRIEF DESCRIPTION OF THE DRAWINGS

The same reference number represents the same element on all drawings.

DETAILED DESCRIPTION OF THE INVENTION

FIGS. 1–9 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
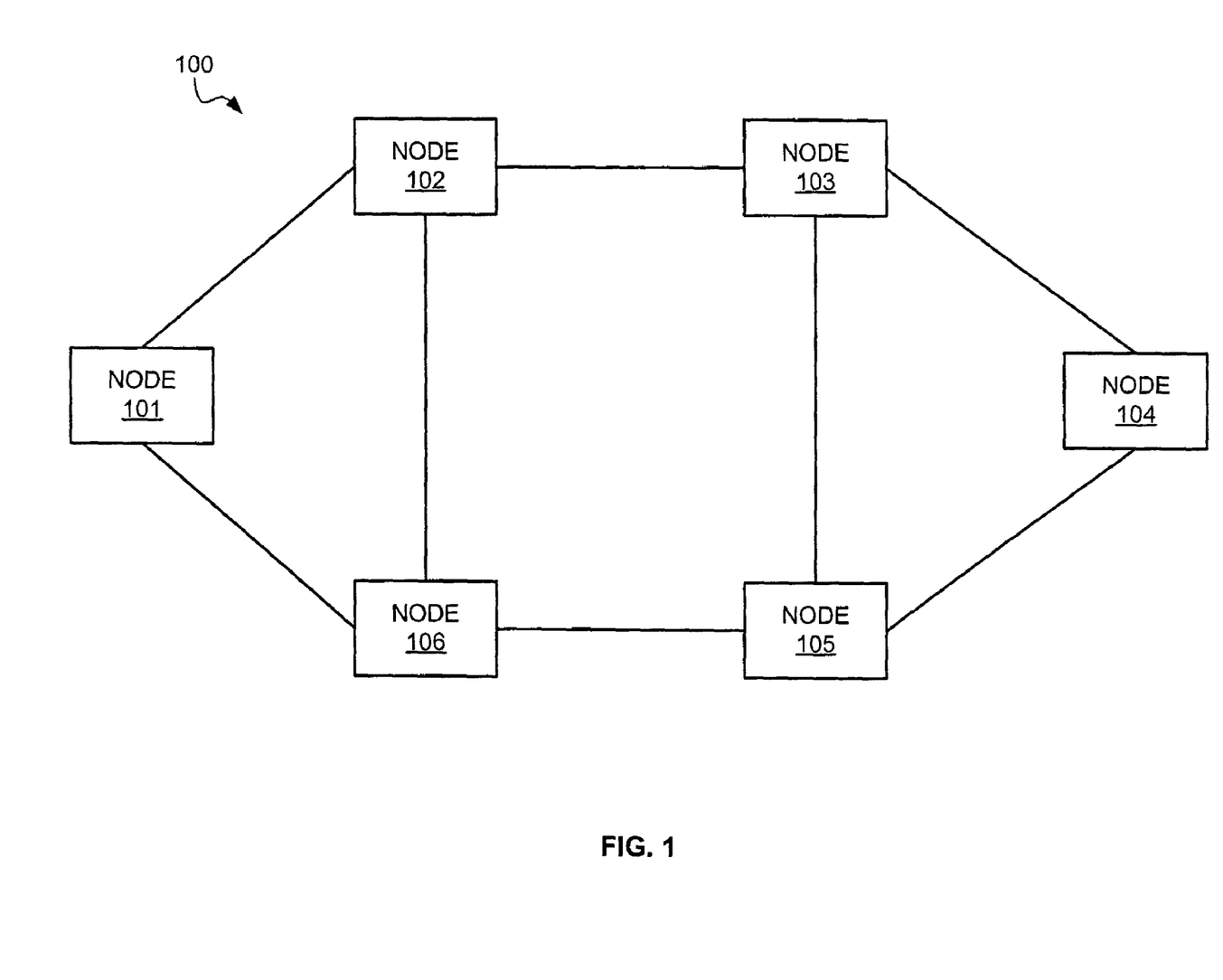
FIG. 1 is an illustration of a communication network in an example of the invention.
Figure 2:
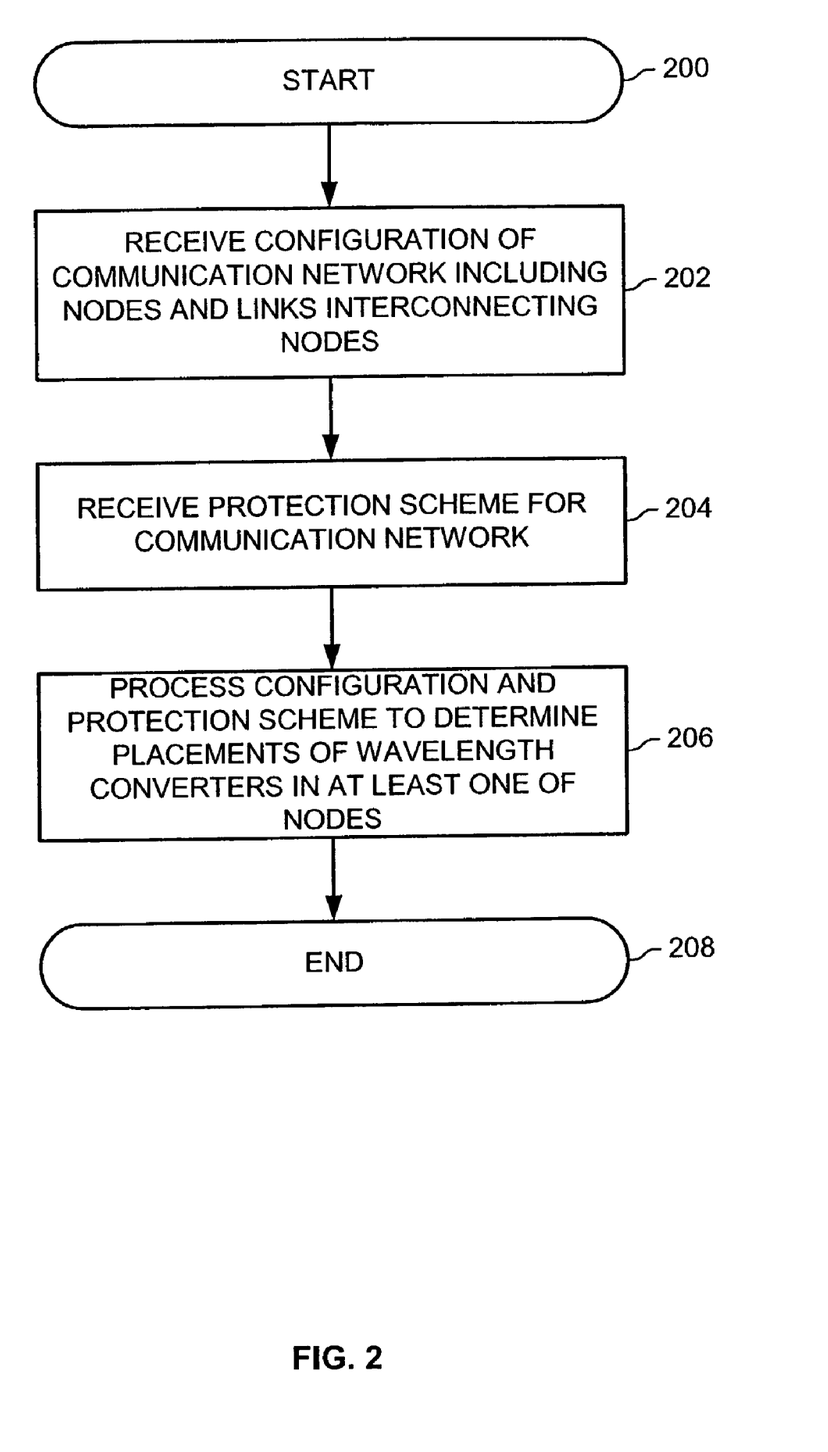
FIG. 2 is a flow chart for a design system for designing a communication network in an example of the invention.

Design System—FIGS. 1–2

FIG. 1 depicts an illustration of a communication network 100 in an example of the invention. The communication network 100 comprises node 101, node 102, node 103, node 104, node 105, and node 106. The node 101 is connected to the node 102 and the node 106. The node 102 is connected to the node 103 and the node 106. The node 103 is connected to the node 104 and the node 105. The node 104 is connected to the node 105. The node 105 is connected to the node 106. FIG. 1 depicts one configuration of the communication network 100 with six nodes for one embodiment of the invention. There are numerous variations in the configuration of the communication network 100 for other embodiments of the invention.

Figure 9:
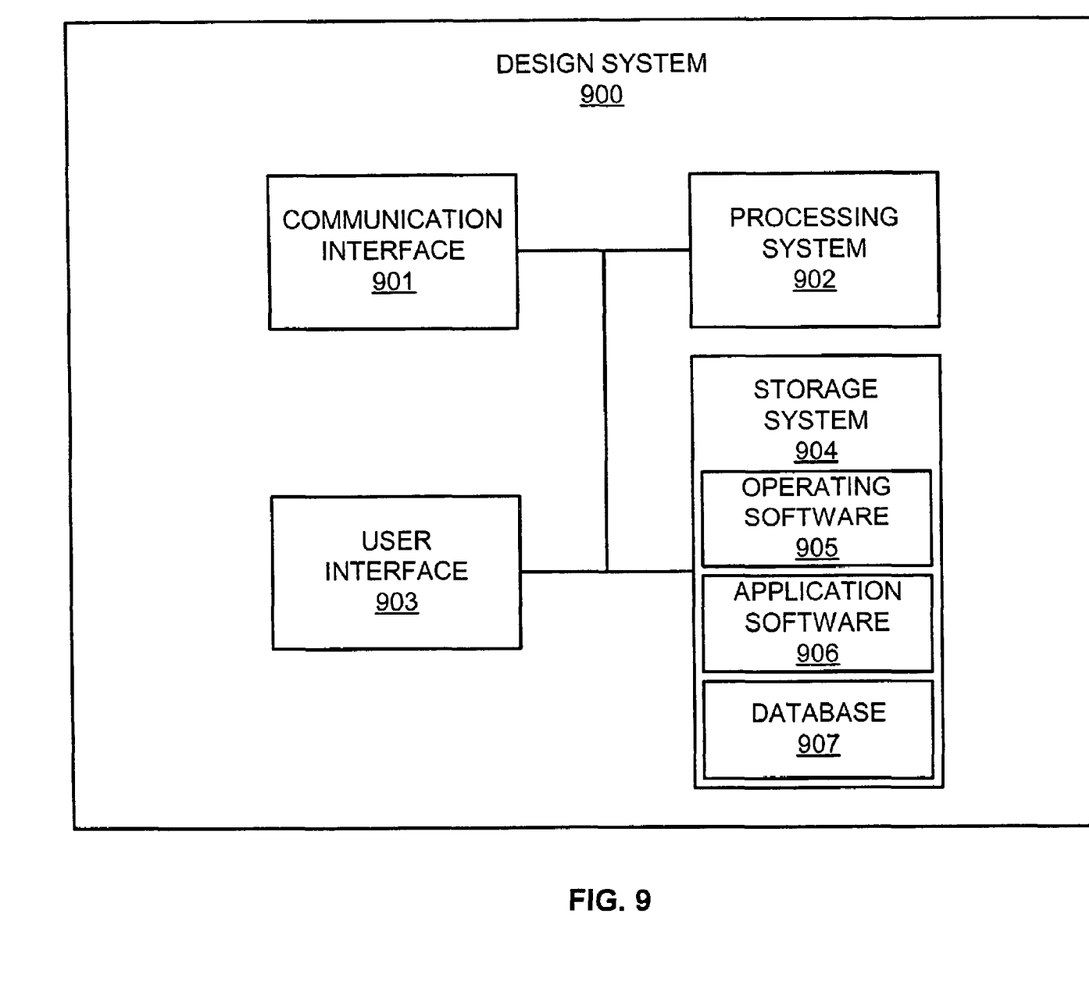
FIG. 9 is a block diagram of a design system in an example of the invention.

FIG. 2 depicts a flow chart for a design system for designing a communication network 100 in an example of the invention. FIG. 2 begins in step 200. In step 202, a design system receives a configuration of the communication network 100 wherein the configuration includes a plurality of nodes and a plurality of links interconnecting the nodes. One example of the design system is shown in FIG. 9. A configuration of the communication network 100 is any arrangement of the communication network 100 that includes nodes and links interconnecting the nodes. A node is any device, group of devices, or system configured to receive and/or transmit optical signals. Some examples of nodes include optical transmitters, optical receivers, optical cross-connects, and wavelength converters. A link is any physical connection configured to connect nodes to each other. An example of a link is an optical fiber.

In step 204, the design system receives a protection scheme for the communication network. A protection scheme is any plan or method for providing a backup route for a working route between nodes. Some examples of protection schemes are 1+1, shared-path protection, and shared-link protection. A wavelength converter is any device, group of devices, or system configured to convert an optical signal at one wavelength to another wavelength. In step 206, the design system processes the configuration and the protection scheme to determine placements of wavelength converters in at least one of the nodes. FIG. 2 ends in step 208.

Figure 3:
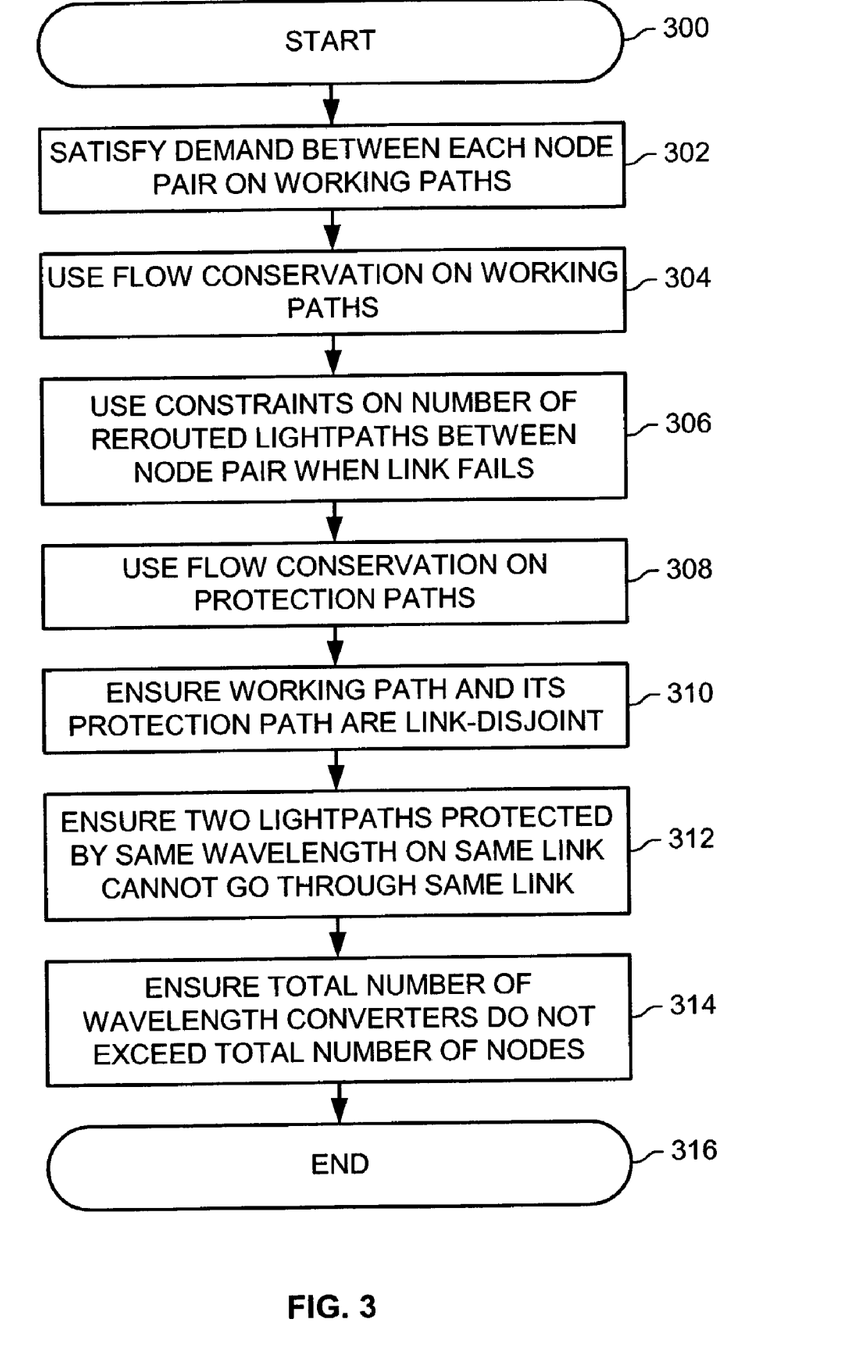
FIG. 3 is a flow chart for an integer linear program in an example of the invention.

Integer Linear Program—FIG. 3

In this embodiment, a design system uses an integer linear program (ILP) to solve a Wavelength-Converter Placement (WCP) problem with shared-path protection. In other embodiments, the ILP is modified to solve the WCP problem with shared-link protection. In this embodiment, the ILP is applied to obtain an optimal solution for small-scale problems, i.e., when both the network and the demand set is small. The WCP problem is an optimization problem and is stated as follows. A physical topology $G=(V, E)$, where V is the set of network nodes and E is the set of physical links, the number of wavelengths on each fiber, and a static traffic demand matrix are given as inputs. Given these inputs, K wavelength-conversion sites ($K<N$) are chosen such that, when each connection request is routed on the physical topology subject to shared-path protection constraints, the total number of wavelengths on all the links in the network, which is also called the total number of wavelength-links, is minimized.

The following are given as inputs:

N: number of nodes in the network;

E: number of links in the network;

W: number of wavelengths available on each link (the wavelengths are numbered from 1 through W, and the same number of wavelengths are available on all links.);

Links={<i, j>}: the set of unidirectional links in the network;

$A_{N \times N}$={$dem_{i,j}$}: the traffic demand matrix, where $dem_{i,j}$ is the number of lightpath requests between node pair (i, j); and K: number of wavelength conversion sites in the network.

The ILP solves for the following variables:

$F_{i,j}^{s,d,w}$ takes the value of 1 if wavelength w on link i→j is utilized by some working path between node pair (s, d); 0 otherwise;

$S_{p,q}^{s,d,w}$ takes the value of 1 if wavelength w on link p→q is utilized by some protection path between node pair (s, d); 0 otherwise;

$\delta_{p,q,i,j}^{s,d,w}$ takes on the value of 1 if wavelength w on link p→q is utilized by some protection path between node pair (s, d) when link i→j fails; 0 otherwise;

$m_{p,q}^{w}$ takes on the value of 1 if wavelength w on link p→q is utilized by some protection path; 0 otherwise; and $wc_i$ takes on the value of 1 if a wavelength converter is placed at node i; 0 otherwise.

FIG. 3 and the following equations illustrate one embodiment of the ILP for solving the WCP problem with shared-path protection. FIG. 3 depicts a flow chart for an integer linear program in an example of the invention. FIG. 3 begins in step 300. The following equation shows the objective of the integer linear program to minimize the total number of wavelength-links:

$$\text{Minimize} \sum_{w=1}^{W} \sum_{<i,j> \in Links} \left( m_{i,j}^{w} + \sum_{1 \leq s, d \leq N} F_{i,j}^{s,d,w} \right)$$

This objective and all of the following constraints are subject to ($1 \leq s, d \leq N, 1 \leq w \leq W$) unless otherwise specified. In step 302, the demand between each node pair (s, d) is satisfied on working paths. The following equations illustrate this step:

$$dem_{s,d} = \sum_{w=1}^{W} \sum_{\forall e:<s,e> \in Links} F_{s,e}^{s,d,w}$$

$$dem_{s,d} = \sum_{w=1}^{W} \sum_{\forall i:<i,d> \in Links} F_{i,d}^{s,d,w}$$

$F_{i,s}^{s,d,w}=0 \ \forall <i,s> \in Links$ $F_{d,e}^{s,d,w}=0 \ \forall <d,e> \in Links$ In step 304, flow conservation on working paths is used, which is illustrated in the following equations:

$$\sum_{w=1}^{W} \sum_{\forall i:<i,j> \in Links} F_{i,j}^{s,d,w} - \sum_{w=1}^{W} \sum_{\forall e:<j,e> \in Links} F_{j,e}^{s,d,w} = 0 \ \ 1 \leq j \neq s, d \leq N$$

Per-wavelength based flow conservation on working paths depends on the node with or without wavelength conversion capability. When $wc_j=0$, the following two in-equations translate into per-wavelength based flow conservation constraint:

$$\sum_{\forall i:<i,j> \in Links} F_{i,j}^{s,d,w} - \sum_{\forall e:<j,e> \in Links} F_{j,e}^{s,d,w} \leq MaxNodalDegree \times wc_j \ \ 1 \leq j \neq s, d \leq N$$

$$\sum_{\forall i:<i,j> \in Links} F_{i,j}^{s,d,w} - \sum_{\forall e:<j,e> \in Links} F_{j,e}^{s,d,w} \geq -MaxNodalDegree \times wc_j \ 1 \leq j \neq s, d \leq N$$

where MaxNodalDegree is the maximal nodal degree, i.e., the maximum number of nodes that a node is connected to, in the network.

In step 306, constraints on the number of rerouted lightpaths between node pair (s, d) when link i→j fails are used, which are recited in the following equations:

$$\sum_{w=1}^{W} F_{i,j}^{s,d,w} = \sum_{w=1}^{W} \sum_{\forall e:<s,e> \in Links} \delta_{s,e,i,j}^{s,d,w} \ \forall <i,j> \in Links$$

$$\sum_{w=1}^{W} F_{i,j}^{s,d,w} = \sum_{w=1}^{W} \sum_{\forall p:<p,d> \in Links} \delta_{s,e,i,j}^{s,d,w} \ \forall <i,j> \in Links$$

$\delta_{p,s,i,j}^{s,d,w}=0 \ \forall <p,s>, <i,j> \in Links$ $\delta_{d,e,i,j}^{s,d,w}=0 \ \forall <d,e>, <i,j> \in Links$ In step 308, flow conservation on protection paths is used and is illustrated in the following equations:

$$\sum_{w=1}^{W} \sum_{\forall p:<p,q> \in Links} \delta_{p,q,i,j}^{s,d,w} - \sum_{w=1}^{W} \sum_{\forall e:<q,e> \in Links} \delta_{q,e,i,j}^{s,d,w} = 0 \ \ 1 \leq q \neq s, d \leq N, <i,j> \in Links$$

Per-wavelength based flow conservation on protection paths depends on the node with or without wavelength conversion capability. When $wc_j=0$, the following two in-equations translate into per-wavelength based flow conservation constraint:

$$\sum_{\forall p:<p,q> \in Links} \delta_{p,q,i,j}^{s,d,w} - \sum_{\forall e'<p,e> \in Links} \delta_{p,e,i,j}^{s,d,w} \leq MaxNodalDegree \times wc_q \ \ 1 \leq q \neq s, d \leq N, <i,j> \in Links$$

$$\sum_{\forall p:<p,q> \in Links} \delta_{p,q,i,j}^{s,d,w} - \sum_{\forall e'<q,e> \in Links} \delta_{p,e,i,j}^{s,d,w} \geq -MaxNodalDegree \times wc_q \ \ 1 \leq q \neq s, d \leq N, <i,j> \in Links$$

In step 310, a working path and its protection path are ensured to be link-disjoint, which is shown in the following equation:

$$\delta_{i,j,i,j}^{s,d,w}=0 \quad \forall <i,j> \in Links$$

In step 312, two lightpaths protected by the same wavelength w on the same link p→q are ensured to not go through the same link i→j, which is shown in the following equation:

$$\sum_{1 \leq s,d \leq N} \delta_{p,q,i,j}^{s,d,w} \leq 1 \forall <p,q>, <i,j> \in Links$$

Constraints indicating whether a wavelength w on link p→q is used by some protection path is shown in the following equations:

$$m_{p,q}^w \leq \sum_{1 \leq s,d \leq N} \sum_{\forall <i,j> \in Links} \delta_{p,q,i,j}^{s,d,w} \forall <p,q> \in Links$$

$$N \times N \times E \times m_{p,q}^w \geq \sum_{1 \leq s,d \leq N} \sum_{\forall <i,j> \in Links} \delta_{p,q,i,j}^{s,d,w} \forall <p,q> \in Links$$

Wavelength w on link i→j can only be utilized by either a working path or protection path, which is shown in the following equation:

$$m_{i,j}^w + \sum_{1 \leq s,d \leq N} F_{i,j}^{s,d,w} \leq 1 \quad \forall <i,j> \in Links$$

In step 314, the total number of wavelength conversion sites in the network is ensured to not exceed K, which is shown in the following equation:

$$\sum_{i=1}^{N} wc_i \leq K$$

FIG. 3 ends in step 316.

Heuristic Algorithms

The following four heuristics to solve the WCP problem are applied for large-scale problems. A heuristic can either place K converters one by one in sequence or place them all at once. The common characteristic of these heuristics is that the heuristics assign a function called potential $\tau(v)$ to each candidate node v, which indicates the suitability of placing a converter at that node. A potential function is a function related to one of the nodes that indicates the suitability of placing one of the wavelength converters at this node and may be obtained through a metric, an equation, or an algorithm. In sequence or all at once, converters are placed at nodes of the highest potentials. A potential function is static if the potential of a node does not depend on the converter placement status at other nodes. Thus, all K converters are placed at once according to the potentials in some embodiments. A potential function is dynamic if the potential of a node changes after placement of a converter at one of the other nodes. In some embodiments, the dynamic potential is reevaluated every time a converter is placed. Hence, wavelength converters are placed either all at once or one by one.

The first heuristic is called nodal degree. This first heuristic is shown by the following equation: $\tau(v)=d(v)$, where d(v) is the degree of node v in the network's topology graph, i.e., how many nodes that node v is connected to.

The second heuristic is called total traffic. This second heuristic is shown by the following equation:

$$\tau(v) = \sum_{l \in E(v)} w(l) + p(l)$$

where E(v) is the set of links that enter or leave node v;
w(l) is the number of wavelengths used for working traffic on link l; and
p(l) is the number of wavelengths used for protection traffic on link l.

Both w(l) and p(l) may change after placing a converter in the network. If all converter are placed at once, $\tau(v)$ is evaluated when the network has no converters, and the K nodes with the highest $\tau(v)$ values are chosen. In other embodiments, the converters are placed one by one and $\tau(v)$ is evaluated for each v where no converter is placed after each placement.

The third heuristic is called protection traffic, which is similar to the total traffic heuristic. This third heuristic is shown by the following equation:

$$\tau(v) = \sum_{l \in E(v)} p(l).$$

This heuristic is based on the observation that wavelength-conversion improves the sharing among protection resources. Hence, the wavelength-links used for protection traffic at a node is used as the measurement of how much potential a node has. Also similar to total traffic, $\tau(v)$ can be evaluated only once when no converter is placed, or re-evaluated after each placement. For simplicity, we evaluate $\tau(v)$ only once for both total traffic heuristic and protection traffic heuristic in obtaining the numerical results.

The fourth heuristic is called Sequential minimum wavelength-links (SMWL). This fourth heuristic is shown by the following equation:

$$\tau(v) = W \times |E| - \sum_{l \in E} w'(l,v) + p'(l,v)$$

where E is the set of links in the network;
w'(l, v) is the number of wavelengths used for working traffic on link l, if a converter is placed at node v; and
p'(l, v) is the number of wavelengths used for protection traffic on link l, if a converter is placed at node v. Hence, W×|E| is the total number of available wavelength-links in the network, and $$\sum_{l \in E} w'(l,v) + p'(l,v)$$

is the number of wavelength-links that will be used in the network if a converter is placed at node v. Since W×|E| is a constant, maximizing $\tau(v)$ is equivalent to minimizing $$\sum_{l \in E} w'(l, v) + p'(l, v).$$

This heuristic places the next converter at a node which yields the minimum wavelength-links over all possible locations for the next converter. This heuristic is called "sequential" because different from previous heuristics, it places the converters one by one and evaluates τ(v) after each placement.

Figure 4:
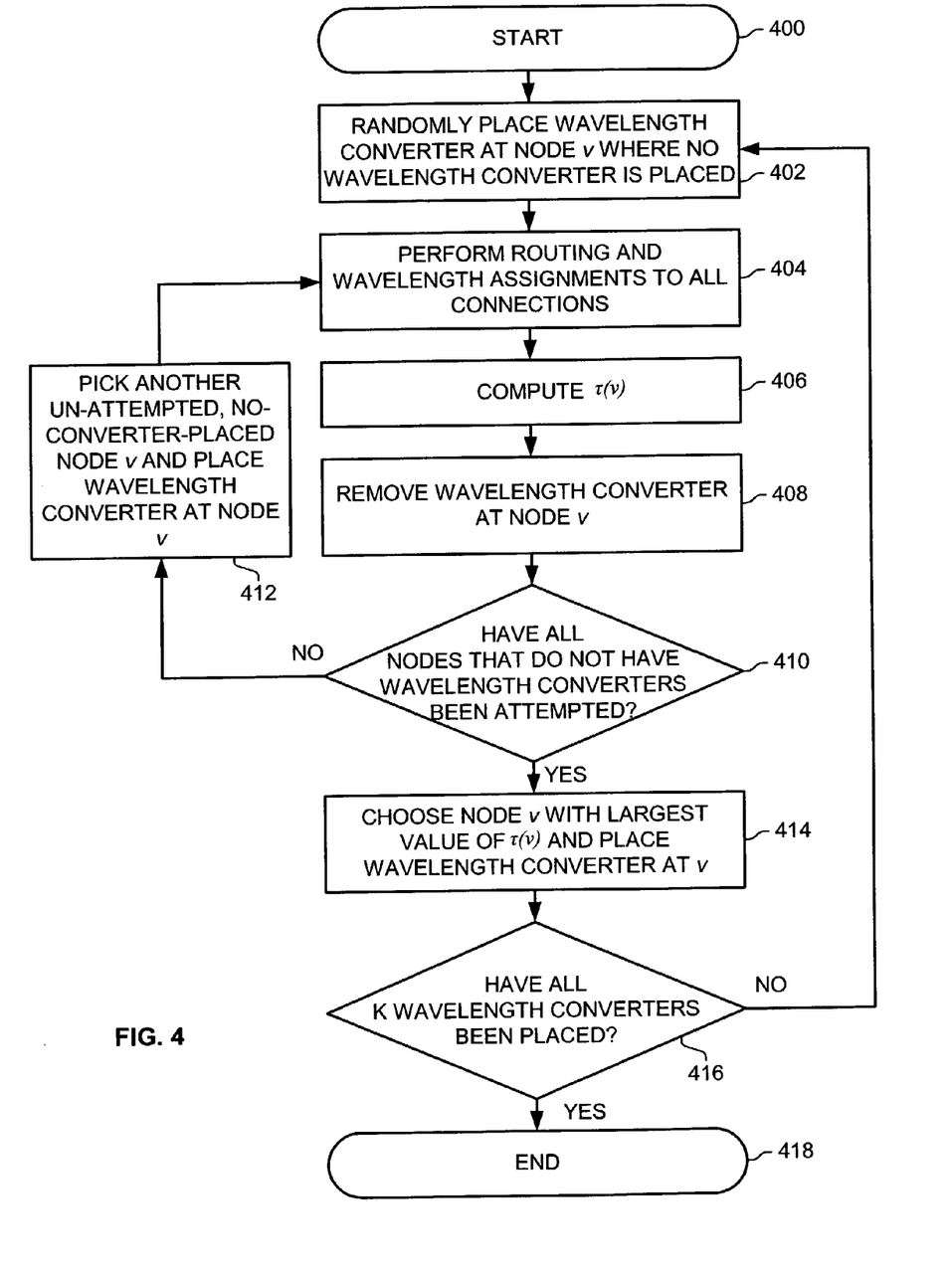
FIG. 4 is a flow chart for a Sequential minimum wavelength-links heuristic in an example of the invention.

FIG. 4 depicts a flow chart for a SMWL heuristic in an example of the invention. FIG. 4 begins in step 400. In step 402, a wavelength converter is randomly placed at node v where no wavelength converter is placed. In step 404, the routing and wavelength assignments to all connections are performed. In step 406, τ(v) is computed. In step 408, the wavelength converter at node v is removed. In step 410, a determination is made whether all nodes that do not have wavelength converters have been attempted. If all nodes that do not have wavelength converters have not been attempted, another un-attempted, no-converter-placed node v is picked and a wavelength converter is placed at node v in step 412 before returning to step 404. If the all nodes that do not have wavelength converters have been attempted, node v with the largest value of τ(v) is chosen, and the wavelength converter is placed at node v in step 414. In step 416, a determination is made whether all the K wavelength converters have been placed. If all the K wavelength converters have not been placed, the process returns to step 402. If all the K wavelength converters have been placed, FIG. 4 ends in step 418.

The nodal degree heuristic utilizes a static function as τ(v), so it runs in constant time. The total traffic heuristic and the protection traffic heuristic both employ a dynamic function but evaluate the function only once. If each execution of the protection algorithm takes time T, then the total traffic heuristic and the protection traffic heuristic both take time T. Note that the outcome of the protection algorithm is the number of wavelengths used on each link for working and protection traffic. The SMWL heuristic employs a dynamic function and evaluates the function dynamically after each placement. To place the first converter it must evaluate N nodes separately, to place the second converter it must evaluate (N−1) nodes separately, . . . until all K converters are placed. Totally it must evaluate (2N−K+1)K/2 times. Because each execution takes time T, the SMWL heuristic will take time (2N−K+1)KT/2, which is in the order of $O(K^2 T)$. Note that the SMWL heuristic takes much longer than the other heuristics but is still much faster compared to the exhaustive search which takes time N!T/(K!(N−K)!).

Figure 5:
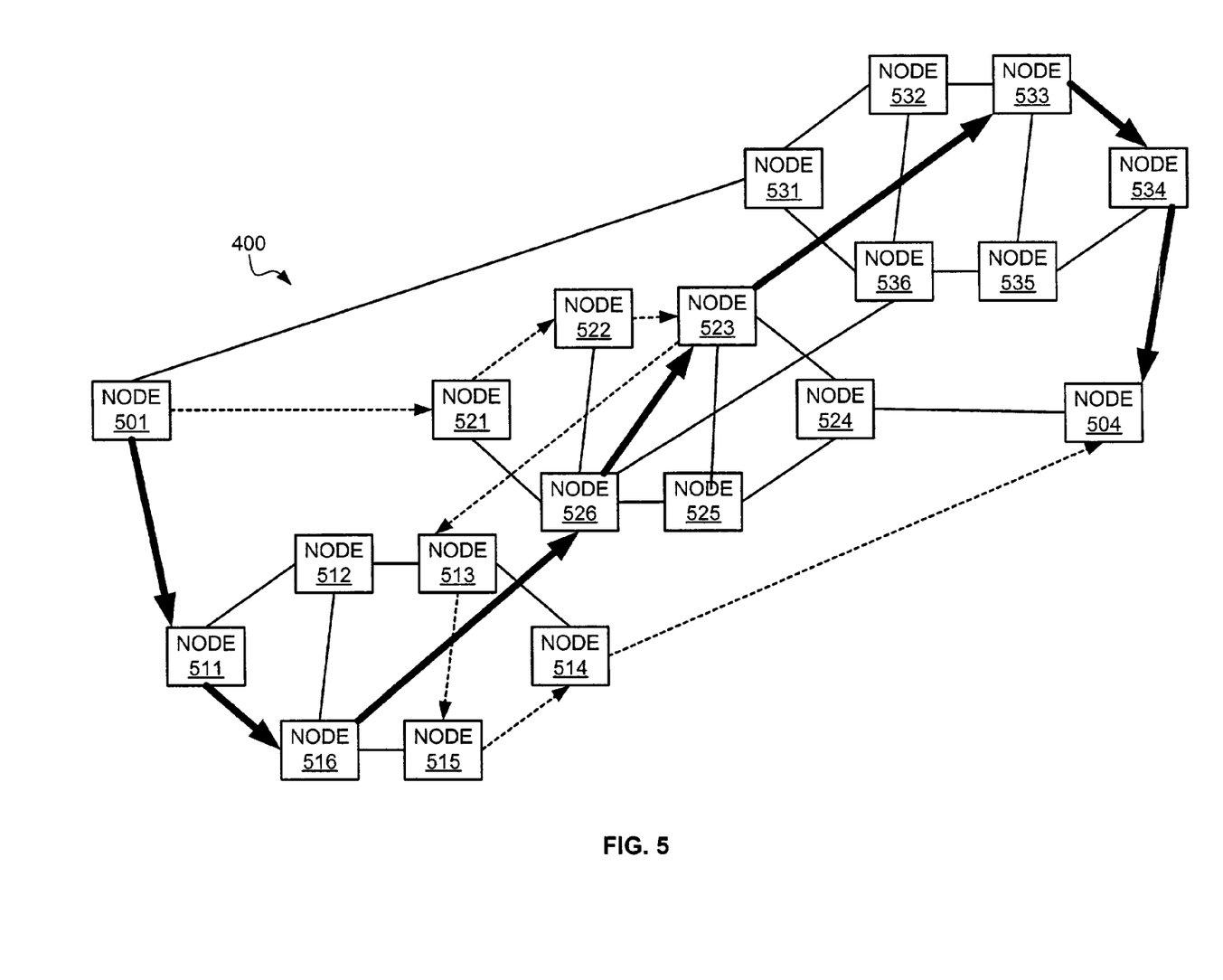
FIG. 5 is a layered graph of a communication network in an example of the invention.

Routing and Wavelength—Assignment—FIG. 5

One embodiment is an algorithm to solve the routing and wavelength assignment (RWA) problem with sparse wavelength converter placement. The routing and wavelength-assignment of working paths and protection paths for the given traffic requests in a network with sparse wavelength-converter placement can be solved using the layered graph shown in FIG. 5.

FIG. 5 depicts a layered graph 500 of the communication network 100 (FIG. 1) in an example of the invention. The communication network 100 includes six nodes, node 101, node 102, node 103, node 104, node 105, and node 106. These six nodes are illustrated in three layers with each layer corresponding to a wavelength. For a network with W wavelengths, W layers are plotted and each layer has the same topology as the original network. Each node has an "image" in every layer. FIG. 5 only shows three layers representing three wavelengths for the sake of simplicity. Nodes 511–516 correspond to wavelength 1. Nodes 521–526 correspond to wavelength 2. Nodes 531–536 correspond to wavelength 3. The last digit in the reference number of nodes 511–516, 521–526, and 531–536 correspond to the last digit in the reference number of the nodes in communication network 100. For example, node 522 represents node 102's image on wavelength 2. Node 103 and node 106 are wavelength convertible. For each of the wavelength-convertible nodes, its images are connected by (W−1) edges, so that each wavelength can be converted to any of the other wavelengths at this node. Therefore, node 513 is connected to node 523, which is connected to node 533; and node 516 is connected to node 526, which is connected to node 536. For each traffic request, a pseudo source vertex (S) and a pseudo destination vertex (D) are added to the graph and connected to each of the images of the source node and the destination node, respectively. For the request from node 101 to node 104 in communication network 100, a pseudo source node 501 and a pseudo destination node 504 are inserted in to the layer graph 500. Node 501 is connected to all the images of node 101, which are node 511, node 521, and node 531. Node 504 is connected to all the images of node 104, which are node 514, node 524, and Node 534.

A working path and a protection path are computed on the layered graph. Dijkstra's shortest-path routing algorithm is applied to this graph to find the shortest path from the pseudo source to the pseudo destination, which will be the working path. Then, the edges that are used in the working path and cannot be used in the protection path, as required by different shared-protection schemes, (such as the edges representing a certain wavelength-link), are removed from this graph. To find the protection path with the maximum sharing among protection resources, the shortest-widest Bellman-Ford algorithm is applied to the graph and the shortest-widest path from the pseudo source to the pseudo destination is found. The width of a path is defined to be the minimum width of the links on the path; and the width of a link reflects the shareability of the wavelengths on the link. Therefore, the widest path is the path with the most sharing.

The working path is designated by bold lines and arrows in FIG. 5. The working path comprises links between node 501, node 511, node 516, node 526, node 523, node 533, node 534 and node 504. The protection path is designated by dotted lines and arrows in FIG. 5. The protection path comprises links between node 501, node 521, node 522, node 523, node 513, node 515, node 514, and node 504. FIG. 5 depicts one layered graph representation of one communication network 100. There are numerous variations in the representation of communication networks for other embodiments of the invention with different network configurations, connections and wavelengths.

Figure 6:
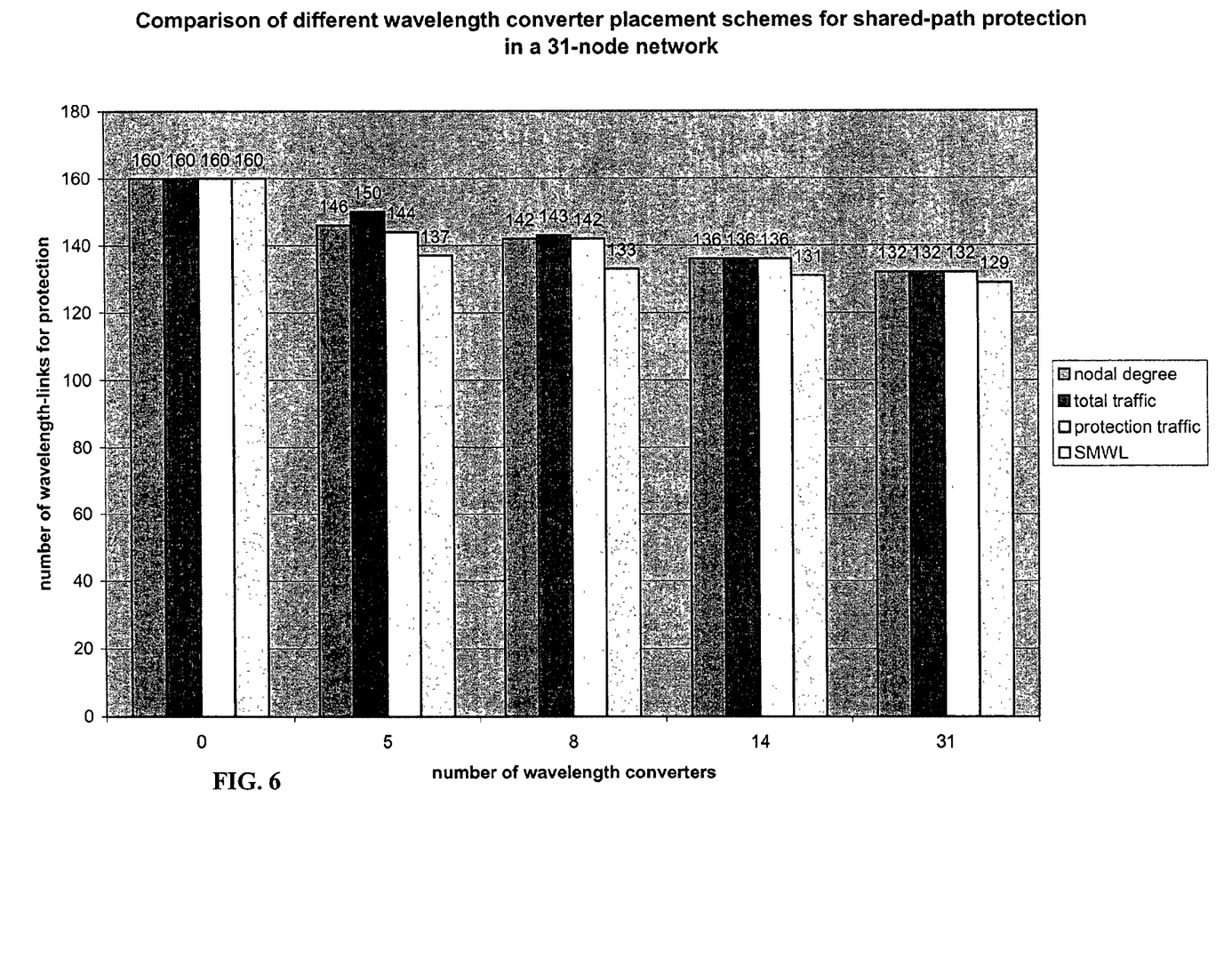
FIG. 6 is a graph of a comparison of four wavelength-converter placement schemes for shared-path protection in an example of the invention.
Figure 7:
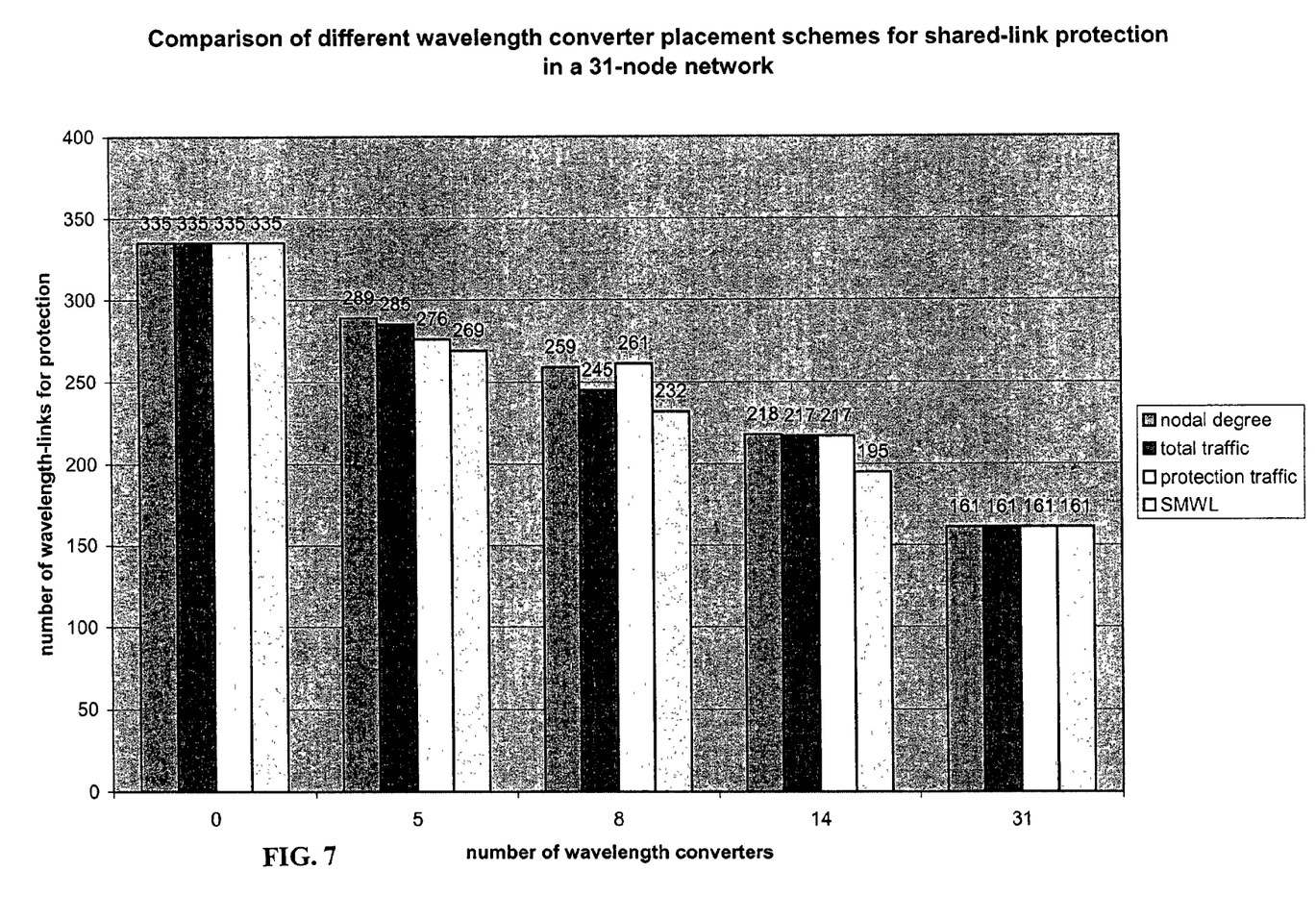
FIG. 7 is a graph of a comparison of four wavelength converter placement schemes for shared-link protection in an example of the invention.
Figure 8:
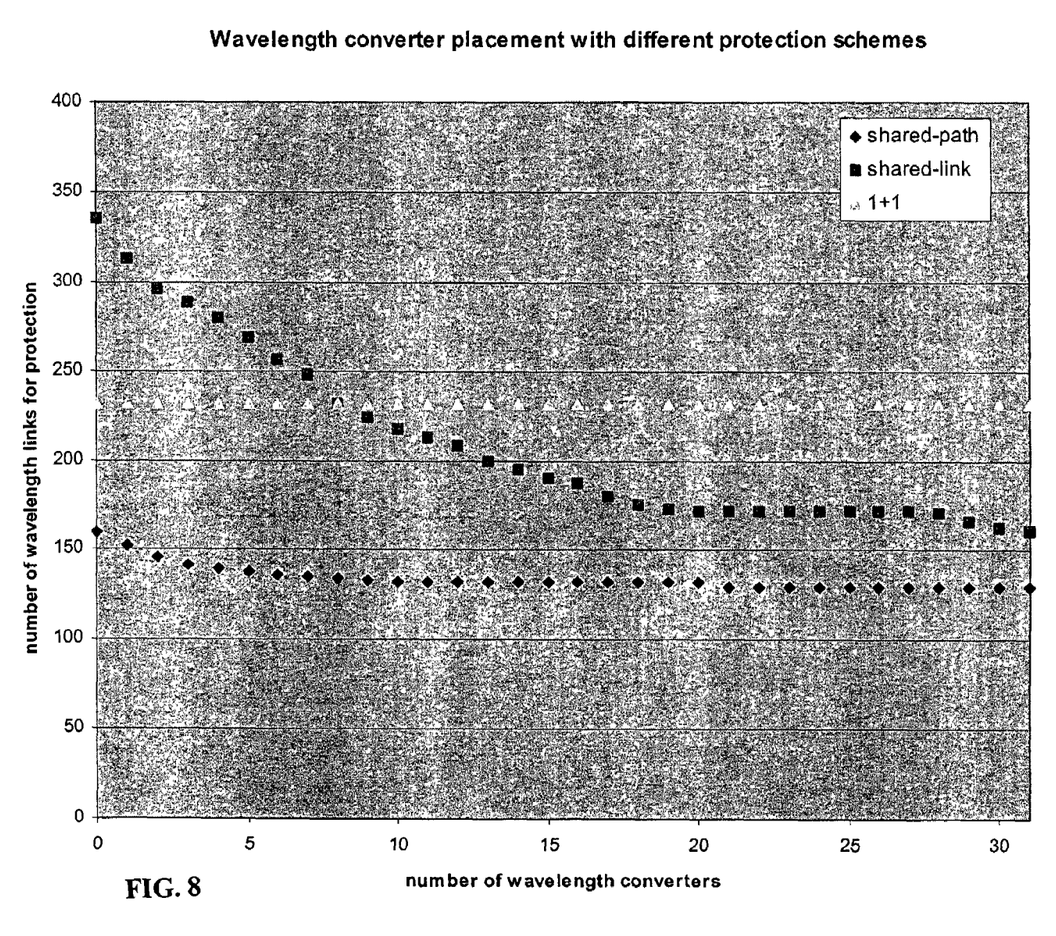
FIG. 8 is a graph of a number of wavelength-links required by two shared-protection schemes and 1+1 versus a number of wavelength converters with sequential minimum wavelength-links placement in an example of the invention.

Numerical Results—FIGS. 6–8

FIGS. 6–8 depict numerical results for the four heuristics discussed above in a nation-wide network with 31 nodes, 47 bi-directional fiber links and 100 lightpath demands. FIGS. 6 and 7 compare the performance of the four heuristics on the network. FIG. 6 depicts a graph of a comparison of four wavelength-converter placement schemes for shared-path protection in an example of the invention. Each scheme is evaluated when no converter is placed (K=0), a limited number of converters are placed (K=5, 8, 14), and full converter placement (K=31). FIG. 6 depicts a graph of a comparison of four wavelength converter placement schemes for shared-path protection in an example of the invention. FIG. 7 depicts a graph of a comparison of four wavelength converter placement schemes for shared-link protection in an example of the invention. Each scheme is evaluated when no converter is placed (K=0), a limited number of converters are placed (K=5, 8, 14), and full converter placement (K=31). FIG. 6 and FIG. 7 show that sequential minimum wavelength-links placement outperforms the other three schemes when non-zero converters are placed. The cases in which no wavelength converter and in which every site is wavelength-convertible are also included for comparison. With both protection schemes, the SMWL placement scheme outperforms the other three schemes.

The performance of the network with a limited number of wavelength conversion sites is then examined. In this embodiment, the SMWL heuristic is used in FIG. 8. FIG. 8 depicts a graph of a number of wavelength-links required by two shared-protection schemes and 1+1 versus a number of wavelength converters with SMWL placement in an example of the invention. 1+1 has constant wavelength-link requirement, i.e., wavelength-conversion does not affect the number of wavelength-links required by 1+1 because no sharing is possible. Shared-path protection has the lowest requirement of wavelength-links. The number of wavelength-links used for working paths does not change with the number of converters, so only the results on wavelength-links used for protection paths are shown. The curves for shared-path protection stabilizes when K>5, which means for shared-path protection, only ⅕ of the nodes in the network need the wavelength-conversion functionality to achieve the resource utilization acquirable by a fully wavelength-convertible network, i.e., each node is wavelength-convertible. For shared-link protection, the benefit of having limited wavelength-converter placement is not so big as in shared-path protection. Eight converters are needed for shared-link protection to use not more than the number of wavelength-links that 1+1 requires. The curve for shared-link protection does not stabilize until about ⅔ of the nodes in the network are wavelength-convertible. Therefore shared-link protection is more sensitive to wavelength-conversion and more converters are required to achieve resource-efficiency if shared-link protection is utilized. With a limited number of wavelength converters, shared-path protection performs better than shared-link protection in bandwidth efficiency. However, shared-link protection might be preferred for other performance factors such as protection switching time. The selection of protection type should take into account not only the resource utilization but also the Service Level Agreements (SLAs). Proper placement of wavelength converters can help to increase the network utilization without sacrificing SLAs.

Design System—FIG. 9

In some embodiments, a design system performs the above-described functions such as generating the software model and routing and wavelength assignment to operate in accord with the invention. FIG. 9 depicts a block diagram of a design system 900 in an example of the invention. Design system 900 includes communication interface 901, processing system 902, user interface 903, and storage system 904. Storage system 904 stores operating software 905, application software 906, and database 907. Processing system 902 is linked to communication interface 901, user interface 903, and storage system 904. Design system 900 could be comprised of a programmed general-purpose computer, although those skilled in the art will appreciate that programmable or special purpose circuitry and equipment may be used. Design system 900 may use a client server architecture where operations are distributed among a server system and client devices that together comprise elements 901–906.

Communication interface 901 could comprise a network interface card, modem, port, or some other communication device. Communication interface 901 may be distributed among multiple communication devices. Processing system 902 could comprise a computer microprocessor, logic circuit, or some other processing device. Processing system 902 may be distributed among multiple processing devices. User interface 903 could comprise a keyboard, mouse, voice recognition interface, microphone and speakers, graphical display, touch screen, or some other type of user device. Storage system 904 could comprise a disk, tape, integrated circuit, server, or some other memory device. Storage system 904 may be distributed among multiple memory devices.

Processing system 902 retrieves and executes operating software 905 and application software 906 from storage system 904. Operating software 905 may comprise an operating system, utilities, drivers, networking software, and other software typically loaded onto a general-purpose computer. Application software 906 could comprise an application program, firmware, or some other form of machine-readable processing instructions. When executed by processing system 902, application software 906 directs processing system 902 to operate in accord with the invention as described above. Database 907 stores information related to the communication network such as nodes, links, connections, and wavelength converters.

The invention claimed is:

1. A method of designing a communication network that uses wavelength division multiplexing, the method comprising:
    receiving a configuration of the communication network wherein the configuration includes a plurality of nodes, a plurality of links interconnecting the nodes, and a number of wavelengths available on each of the plurality of links;
    receiving a protection scheme for the communication network;
    processing the configuration and the protection scheme to determine placements of wavelength converters in at least one of the nodes; and
    placing the wavelength converters to minimize network resource usage by maximizing protection resource sharing.

2. The method of claim 1 wherein the configuration comprises an amount of traffic between the plurality of nodes.

3. The method of claim 1 wherein the configuration comprises a number of the wavelength converters in the communication network.

4. The method of claim 1 further comprising minimizing a total number of wavelength-links.

5. The method of claim 1 further comprising using an integer linear program wherein the integer linear program comprises flow conservation to guarantee either per node or per wavelength per node depending on whether or not a wavelength converter is placed at one of the nodes.

6. The method of claim 1 further comprising determining potential functions for each of the plurality of nodes wherein the potential functions indicate a suitability of placing one of the wavelength converters at one of the nodes and wherein processing the configuration and the protection scheme to determine placements of wavelength converters in at least one of the nodes uses the potential functions.

7. The method of claim 6 wherein one of the potential functions indicates a number of nodes that one of the nodes is connected to.

8. The method of claim 6 wherein one of the potential functions indicates a number of wavelengths used for working traffic or protection traffic on the links that one of the nodes is connected to.

9. The method of claim 6 wherein one of the potential functions indicates a number of wavelengths used for protection traffic on the links that one of the nodes is connected to.

10. The method of claim 9 wherein one of the potential functions indicates a number of wavelengths used for working traffic or protection traffic on all of the links in the communication network when one of the wavelength converters is placed at one of the nodes.

11. A design system for designing a communication network that uses wavelength division multiplexing, the design system comprising:
a processing system configured to receive a configuration of the communication network wherein the configuration includes a plurality of nodes, a plurality of links interconnecting the nodes, and a number of wavelengths available on each of the plurality of links, receive a protection scheme for the communication network, and process the configuration and the protection scheme to determine placements of wavelength converters in at least one of the nodes to minimize network resource usage by maximizing protection resource sharing; and
an interface configured to transfer the configuration and the protection scheme to the processing system.

12. The design system of claim 11 wherein the configuration comprises an amount of traffic between the plurality of nodes.

13. The design system of claim 11 wherein the configuration comprises a number of the wavelength converters in the communication network.

14. The design system of claim 11 wherein the processing system is configured to minimize a total number of wavelength-links.

15. The design system of claim 11 wherein the processing system is configured to use an integer linear program wherein the integer linear program comprises flow conservation to guarantee either per node or per wavelength per node depending on whether or not a wavelength converter is placed at one of the nodes.

16. The design system of claim 15 wherein one of the potential functions indicates a number of wavelengths used for protection traffic on the links that one of the nodes is connected to.

17. The design system of claim 16 wherein one of the potential functions indicates a number of wavelengths used for working traffic or protection traffic on all of the links in the communication network when one of the wavelength converters is placed at one of the nodes.

18. The design system of claim 11 wherein the processing system is configured to determine potential functions for each of the plurality of nodes wherein the potential functions indicate a suitability of placing one of the wavelength converters at one of the nodes and process the configuration and the protection scheme to determine placements of wavelength converters in at least one of the nodes using the potential functions.

19. The design system of claim 18 wherein one of the potential functions indicates a number of nodes that one of the nodes is connected to.

20. The design system of claim 18 wherein one of the potential functions indicates a number of wavelengths used for working traffic or protection traffic on the links that one of the nodes is connected to.

21. A computer-readable medium having encoded thereon software for designing a communication network that uses wavelength division multiplexing, the software comprising;
application software encoded on a computer readable medium operational when executed by a processor to direct the processor to receive a configuration of the communication network wherein the configuration includes a plurality of nodes, a plurality of links interconnecting the nodes, and a number of wavelengths available on each of the plurality of links, receive a protection scheme for the communication network, and process the configuration and the protection scheme to determine placements of wavelength converters in at least one of the nodes.

22. The computer-readable medium of claim 21 wherein the configuration comprises an amount of traffic between the plurality of nodes.

23. The computer-readable medium of claim 21 wherein the configuration comprises a number of the wavelength converters in the communication network.

24. The computer-readable medium of claim 21 wherein the application software is operational when executed by the processor to direct the processor to minimize a total number of wavelength-links.

25. The computer-readable medium of claim 21 wherein the application software is operational when executed by the processor to direct the processor to use an integer linear program wherein the integer linear program comprises flow conservation to guarantee either per node or per wavelength per node depending on whether or not a wavelength converter is placed at one of the nodes.

26. The computer-readable medium of claim 21 wherein the application software is operational when executed by the processor to direct the processor to determine potential functions for each of the plurality of nodes wherein the potential functions indicate a suitability of placing one of the wavelength converters at one of the nodes and process the configuration and the protection scheme to determine placements of wavelength converters in at least one of the nodes using the potential functions.

27. The computer-readable medium of claim 26 wherein the potential functions indicate a number of nodes that one of the nodes is connected to.

28. The computer-readable medium of claim 26 wherein the one of potential functions indicates a number of wavelengths used for working traffic or protection traffic on the links that one of the nodes is connected to.

29. The computer-readable medium of claim 26 wherein the one of potential functions indicates a number of wavelengths used for protection traffic on the links that one of the nodes is connected to.

30. The computer-readable medium of claim 29 wherein one of the potential functions indicates a number of wavelengths used for working traffic or protection traffic on all of the links in the communication network when one of the wavelength converters is placed at one of the nodes.

* * * * *